(Model.)
A. WILLIAMS.
TOOL FOR FILLING TEETH.
No. 368,988. Patented Aug. 30, 1887.
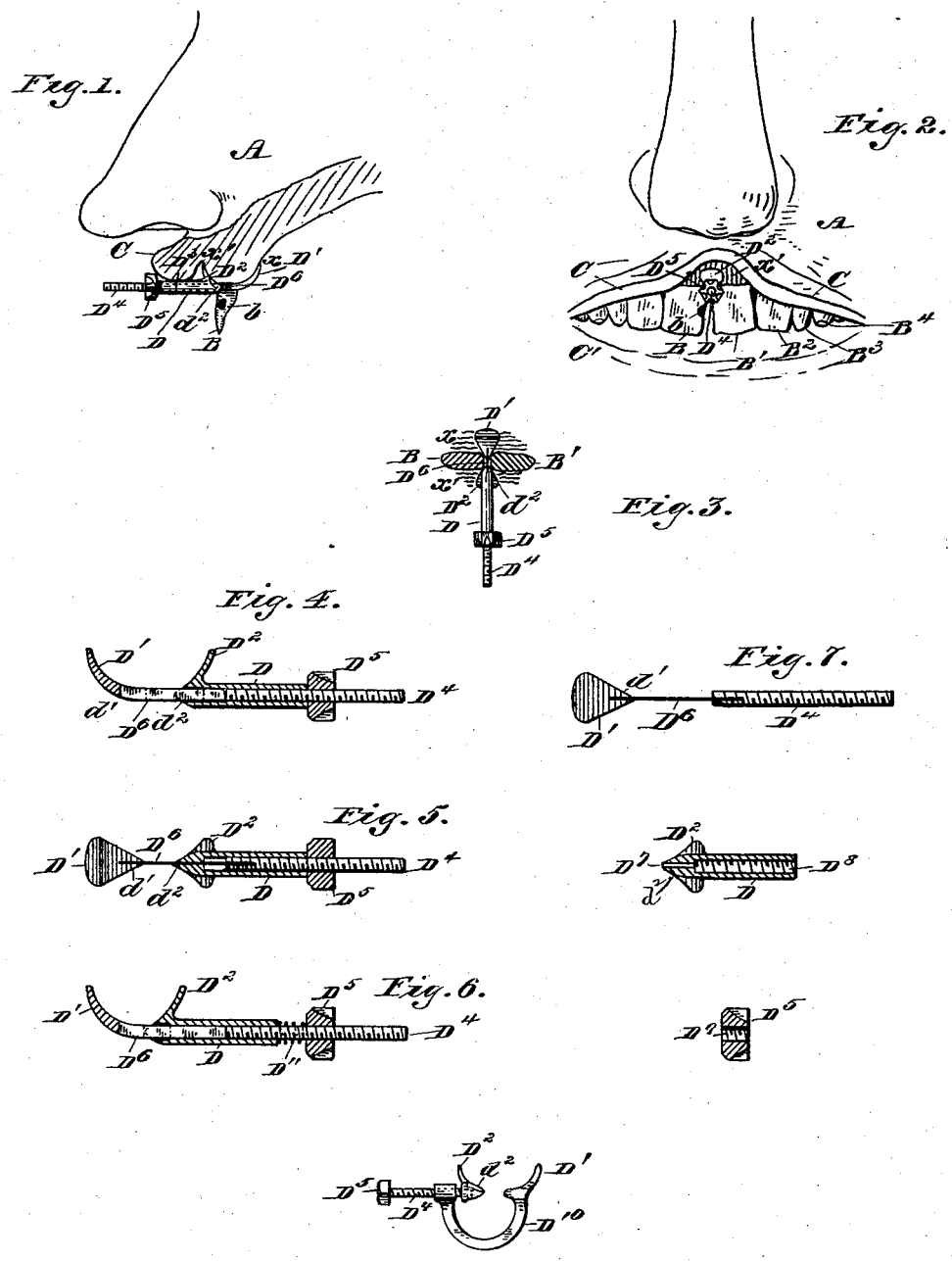
WITNESSES:
INVENTOR
Alfred Williams,
per Isaac W. Heysinger
Att'y

UNITED STATES PATENT OFFICE.

ALFRED WILLIAMS, OF PHILADELPHIA, PENNSYLVANIA.

TOOL FOR FILLING TEETH.

SPECIFICATION forming part of Letters Patent No. 368,988, dated August 30, 1887.

Application filed May 21, 1887. Serial No. 238,941. (Model.)

*To all whom it may concern:*

Be it known that I, ALFRED WILLIAMS, of Philadelphia, in the county of Philadelphia and State of Pennsylvania, have invented certain new and useful Improvements in Tools for Filling Teeth, &c., of which the following is a full, clear, and exact description, reference being had to the drawings accompanying and forming a part of this specification, in which—

Figure 1 is a vertical section from front to rear of part of a human face, showing the lip, gum, and a front tooth with my invention applied thereto as in use. Fig. 2 is a front view of a similar face with my invention applied to spread apart two of the front teeth thereof for filling the same. Fig. 3 is a transverse section of two teeth at their insertion in the gum, showing my invention between the same. Fig. 4 is a vertical longitudinal section along the flat blade, which passes between the teeth, of my invention. Fig. 5 is a transverse longitudinal section through the same. Fig. 6 is a similar view to Fig. 4, except that the wedges have been drawn together as in use. Fig. 7 shows the various parts of my device detached from each other, and Fig. 8 is a modification of the same.

The lettering in all the figures is uniform.

The object of my invention is to produce a mechanical tool or device for the use of dentists by means of which cavities requiring to be filled with gold, composition, or other material can be readily reached when they exist between the opposing sides of adjacent teeth, and especially front teeth, and in which the saliva is prevented from descending into the said cavities during the operation of filling the same. To prevent the descent of saliva into the cavity, which will cause the filling to be useless when applied, a rubber dam having a hole therein is used, which is sprung around the neck of the tooth, the sides projecting all around and outside the mouth to form a protecting-roof and guide the saliva into other channels. This also is disagreeable and troublesome both to the operator and the subject, and is not always effective for the purpose.

My invention consists of a pair of flanged wedges movable to and from each other, presenting their apices between the teeth to be separated, and connected by a thin blade passing through the interspace between the necks of the teeth at the point of their insertion in the gums, the said wedges drawn together gradually by a screw tightened up from time to time by the operator or by a spring bringing the said wedges together by its tension. I provide these wedges with curved flanges, concave upon their upper surfaces, to impinge against the convex surfaces of the gums and prevent the blade of the tool from riding up into the said gum between the teeth, and also by its surface and pressure to prevent the saliva from descending along the surfaces of the teeth to be operated upon and to deflect it to one side or the other, and at the same time prevent secretion from the gum itself where held under pressure of the flanges of the said tool. While I sometimes use a spring to operate these wedges, I prefer to use a screw, as shown in the figures, or I use a spring and screw combined, as shown in Fig. 6; and instead of a blade passing between the teeth to connect the opposite wedges, I sometimes use an arm extending around the teeth, as shown in Fig. 8; but I usually prefer to use the device constructed in its lighter and simpler form, as shown in Fig. 1.

Referring to the drawings, in Fig. 1 is shown the device as used by a dentist in filling one of the middle incisors, B, the cavity of which is shown at $b$. In Fig. 2 the same is shown in front view, the teeth B and B' being separated by the instrument D inserted between the same. Ordinarily these front teeth have their edges nearly or quite in contact, as shown in Fig. 2 at B' B²; but usually sufficient space is found between them to allow the insertion of a flat watch-spring, which is what I prefer to use in forming the blade $D^6$, as shown in Fig. 7. When such blade cannot be inserted, the teeth may be slightly separated by a wooden peg or otherwise, the same being removed when the instrument is in place.

The different parts of the device are shown in Fig. 7 separated from each other. An elongated stem, $D^4$, screw-threaded, as shown, is slitted at one end, and into this slot is inserted and soldered, brazed, or riveted a blade, $D^6$, which I prefer to make of a short piece of watch-spring steel. To the forward end of this spring is attached a flanged wedge, D', into a slit of which the blade $D^6$ is inserted and soldered fast as its opposite end is secured to the screw-stem D⁴. Over this blade D⁶ and screw-stem D⁴ is slipped the sleeve D, having an internal bore, D⁸, adapted to slip freely to and fro along the screw-stem D⁴, and having a flanged wedge, D², facing opposite D'. The sleeve D at its forward end is provided with a narrow slit, D⁷, opening into the bore D⁸, and fitted to embrace the blade D⁶ and guide the sleeve D along the stem D⁴ without allowing any rotation thereupon. I prefer to slip the sleeve D over the blade D⁶ and stem D⁴ before attaching the flanged wedge D', which is afterward secured to the projecting free end of the blade D⁶. The flanged wedges D' and D² stand with their slopes upward, as shown in Fig. 6, so as to embrace the free surface of the gum upon its opposite sides, and they are provided with laterally-sloping transverse surfaces $d'$ $d^2$, forming a double wedge portion, the apices being presented toward each other, as shown in Fig. 5. The nut D⁵, having an internal screw-thread, D⁹, is applied to the stem B⁴ at its rear end, and by its forward motion will draw the wedges toward each other.

When the blade D⁶ is slipped up between two teeth, as shown in Figs. 1, 2, and 3, the rear flange of the flanged wedge D' will clasp the rear side of the gum, the front flange of the flanged wedge D² will clasp the front side of the gum, and the wedge portions $d'$ and $d^2$ will abut with their opposite sides against the inwardly-facing free edges of the adjacent teeth B and B'. The lip, also, C (see Fig. 1) will rest upon the forwardly-projecting stem D⁴, and the nut D⁵, when rotated, will gradually draw the wedge portions $d'$ $d^2$ together, the flanges of the flanged wedges D' D² preventing the blade D⁶ from rising and cutting into the gum between the teeth. As teeth very readily move under continued pressure, the nut D⁵, given a turn every few moments, will gradually spread the lower parts of the teeth apart, as shown in Fig. 2, without pain and without perceptible annoyance. The dentist, thus tightening up the nut D⁵ from time to time while he is preparing his material, by the time he is ready to operate upon the teeth they will be separated from each other sufficiently to allow perfect freedom in working. It will be observed, also, that teeth growing in wrong positions or overlapping each other may be very readily corrected by the use of this little instrument, which may be allowed to remain in the mouth until a permanent change be effected, the stem D⁴ and sleeve D being properly shortened.

When in position for filling the cavity of a tooth, as shown in Fig. 1, it will be observed that the broad, flat, upwardly-sloping flange of the flanged wedge D' is drawn firmly against the rear side of the gum and extends upwardly for some distance along the same. One of the greatest annoyances in filling teeth, and one of the greatest dangers, is the introduction of moisture to the cleansed and dried cavity from the descent of saliva, which prevents adhesion of the filling and destroys its permanency. The flange of the flanged wedge D' deflects the saliva as it descends from the roof of the mouth or runs along the gums to one side or the other, as does the front flange of the flanged wedge D² for the saliva under the lip C, so that no saliva descends between the teeth B and B', which when once wiped dry will remain dry during the whole operation. As the lip C rests upon the stem D⁴, the tooth to be filled is kept exposed to view and to the currents of air in the room, which assist in drying the surfaces and facilitate the operation, no special means for raising the lip being requisite. When the operation is concluded, the instrument being removed, the teeth will gradually resume their normal positions in their sockets, and the instrument may be at once applied, if necessary, to the next adjacent teeth—for instance, B' B², Fig. 2—and the tooth B' be bent in an opposite direction without pain or inconvenience, and without delay.

While especially adapted for use with front teeth, the device may be readily used for back teeth, when required, and the stem D⁴ may be applied from the inside of the teeth as well as from the outside, as shown in the figures.

Instead of forming the screw-stem D⁴, blade D⁶, and flanged wedge D' $d'$ of separate pieces, they may be made of a single piece of hammered steel or other material, the whole being silver-plated, nickel-plated, or otherwise finished, and the sleeve D in such cases will be applied from the free end of the stem D⁴, the slot D⁷ being swaged to shape to fit the blade D⁶ and prevent rotation after the sleeve D has been applied.

In Fig. 6 I show a supplemental coiled spring, D¹¹, under the nut D⁵, the action of which will automatically spread the teeth when the nut has been tightened up, without requiring the operation of tightening the same to be repeated so often.

In Fig. 8, also, I show a curved arm, D¹⁰, of rigid material, which extends around the free extremities of the teeth, serving as a substitute for the flat blade D⁶, the screw-stem D⁴ passing through a nut at one end of the arm D¹⁰ and being swiveled in the flanged wedge D², and I otherwise modify the construction of my instrument without departing from the principles of my invention, as herein shown, described, and claimed; but I usually prefer to make the device in the form shown in Fig. 7, as being lighter, smaller, neater, and more effective than other forms hereinabove described.

Having now described my invention, what I claim, and desire to secure by Letters Patent, is—

1. As an article of manufacture, a dental tool for spreading teeth apart, consisting of the opposite wedge portions $d'$ $d^2$, having their apices presented toward each other and connected together by a blade, and provided with suitable mechanism for adjusting said wedge portions to cause the teeth between which the same are inserted to be spread apart, substantially as described.

2. The combination, with the wedge portions $d'$ $d^2$ and flanges $D'$ $D^2$, of the blade $D^6$, attached to one of said wedge portions and passing adjustably through the other, together with the screw-stem $D^4$ and adjusting-nut $D^5$, substantially as described.

3. In a tool for spreading teeth apart preparatory to cleansing and filling cavities in the adjacent surfaces thereof, a narrow flat blade adapted to be inserted between the said teeth, and provided with a wedge-shaped end, in combination with an opposite wedge portion movable to and fro along said blade, adjusted to various distances along the same, and adapted by its forward movement to cause the said wedge portions to be forced between the said teeth to separate the same, substantially as described.

4. In a dental tool, the combination of the opposite flanged wedges $D'$ $D^2$, adapted to embrace the front and rear sides of the gum under pressure, the same held in place by the blade $D^6$, and brought together by means of an adjustable screw, substantially as described.

5. In combination with the flanged wedge $D'$ $d'$, the flat blade $D^6$, attached thereto, the screw-stem $D^4$, attached to said blade $D^6$, adjustable sleeve $D$, surrounding said stem $D^4$, and provided at its forward end with flanged wedge $D^2$ $d^2$, fitted to said flat blade $D^6$ by the narrow slot $D^7$ to prevent rotation thereof, together with the nut $D^5$, adapted to be rotated upon said screw-stem $D^4$ to cause the said flanged wedge $D^2$ $d^2$ to move forward along the said blade $D^6$, substantially as and for the purposes herein shown and described.

6. A dental tool having two oppositely-adjustable wedge portions, their apices presented toward each other, adapted to be gradually drawn or forced into the interspace between adjacent teeth, and having a blade extending from one wedge portion to the other between the said teeth, said wedge portion or portions adjustable thereupon, said blade provided with a screw-stem and nut operating thereupon to force the said wedge portions together, the whole constructed substantially as described.

7. In combination with the flange $D'$ and wedge portion $d'$, provided with flat spring-blade $D^6$ and screw-stem $D^4$, the sleeve $D$, having flange $D^2$, wedge portion $d^2$, and slot $D^7$, fitted to said blade $D^6$, and the nut $D^5$, adapted by its rotation to force the flanged wedges $D'$ $d'$ $D^2$ $d^2$ toward each other, together with the supplemental spring $D^{11}$, adapted to regulate and equalize the pressure of the said wedge portions, substantially as described.

ALFRED WILLIAMS.

Witnesses:
WM. K. BROWN,
F. T. CLARK.